Patented July 17, 1951

2,561,256

UNITED STATES PATENT OFFICE 2,561,256

METHOD OF DRYING SYNTHETIC RUBBER POLYMERS

Howard L. Wilson, Elizabeth, Robert F. Leary, Cranford, and Joseph F. Nelson, Rahway, N. J., assignors to Standard Oil Development Company, a corporation of Delaware Application May 22, 1948, Serial No. 28,634

10 Claims. (Cl. 260—85.3)

This invention relates to the separation of solid polymers in substantially dry condition from slurries in liquids; relates particularly to means and methods for recovering solid polymers in nearly dry condition by the presence of a water-repellent coating; and relates especially to a non-turbulent rapidly flowing liquid stream or a high speed liquid vortex containing a water-repellent medium having an affinity for the surface of the solid polymer, into which a slurry of polymer is dropped, whereby the solid polymer is separated from the slurry in substantially water-free condition.

In the preparation of solid polymers, whether of the rubbery type or the resin type, the polymers usually are obtained either in solution or in suspension in some carrying liquid which may be a more or less low-boiling, non-aqueous liquid or may be water from which the polymer must be recovered in dry form.

According to the present invention, this recovery is effected by the steps of forming a rapid vortex or other rapid, smoothly flowing stream of water, dropping onto the stream or vortex a small supply of a substance (such as zinc stearate) which is readily adsorbed onto the surface of the polymer particles, but which, at the same time, is difficultly wetted by water and has a strongly water-repellent effect, dropping the slurry, suspension, or solution of the polymer into the vortex, and thereafter separating the coated polymer particles from the surface of the vortex by any convenient means.

The process is particularly efficiently applicable to the low temperature interpolymer of a major proportion of isobutylene with a minor proportion of a multiolefin such as isoprene, produced in a low-boiling diluent or diluent-refrigerant such as ethyl or methyl chloride or ethane or ethylene or propane or butane, or the like by the application to the mixture of isobutylene with isoprene or the like in the diluent, of a solution of aluminum chloride preferably at about −100° C. The polymer produced is then delivered to a stream or vortex of warm water along with a supply of the water-repellent coating material. The process is similarly applicable to analogous polymer slurries, whether in non-aqueous liquid or aqueous liquid.

Thus, for the raw material of the preferred embodiment of the invention, there is produced a low temperature interpolymer of isobutylene with a multiolefin such as isoprene by cooling the mixture, usually in the presence of an appropriate diluent, to a temperature within the range between −40° C. and −164° C., and adding to the cold mixture a Friedel-Crafts catalyst in solution in a low-freezing, non-complex-forming solvent; and commercially this process has been embodied in a continuous reaction in which a supply of the cold polymerizate mixture and catalyst are delivered to a refrigerant jacketed reactor and an overflow of solid polymer, slurried in an excess of the reaction mixture, taken out of the reactor through an overflow.

According to the prior art, this overflow of polymer slurry has been added to a "flash tank" partly filled with vigorously stirred warm water in which the volatiles are flashed out, the polymer slurried in water and transferred in the form of a water slurry to a filter for the removal of as much of the water as possible, and then to a tunnel dryer followed by a mill or kneader or extruder, to remove the last traces of water and produce a dry polymer ready for compounding, molding and curing.

The water slurry produced by this method of the prior art contains from 1% to about 5% of polymer, the remainder being water; the unpolymerized monomer and hydrocarbon solvent diluent having been volatized out from the original hydrocarbon slurry. This material may be filtered in an Oliver-type or other filter to yield a moist mass containing from 30% to 50% of polymer, from which the residual water must be removed by elaborate drying methods.

According to the present invention, the suspension of solid polymer, along with some dissolved polymer, in unreacted isobutylene and diolefin together with the catalyst solvent and the diluent, is delivered to a rapidly rotating vortex of warm water, to which there is also delivered a finely divided, water-repellent solid which has an affinity for the polymer. The essence of the invention is the water vortex, or other form of smooth rapid non-turbulently flowing water, in combination with the finely divided, difficultly wettable solid, applied to the slurry.

The preferred finely divided, difficulty wettable solid is zinc stearate which is found to work very well and is quite inexpensive. Other satisfactory salts or "soaps" are the other alkaline earth metals including all of the metals of groups 2 and 3 of the periodic table having atomic weights between 20 and 125 although aluminum is the only group 3 metal of commercial importance, since the other metals are rare. For the acid portion of the compound, any of the linear organic acids, whether saturated or unsaturated, having from 10 to 30 carbon atoms per molecule, are effective; the preferred acids being stearic, oleic, lauric, (including especially the fish oil acids generally) and the like.

The essential characteristics of this finely divided difficulty wettable substance are only three; that it shall be strongly water-repellent, that it shall have a very low to practically zero solubility in water, and have a strong affinity for, or solubility in, the polymer being separated. These requirements are met by the organic acid salts of the metals of groups 2 and 3 having molecular weights between 20 and 125 as above outlined, the organic acids having from 10 to 30 carbon atoms per molecule and being in a finely divided condition. The high speed vortex, essentially free from turbulence (or other forms of rapid, non-turbulent flow), effects a rapid coating of the particles of polymer by the particles of coating agent, and, at the same time, the difference in specific gravity, rapidly forces the polymer out of the water of the vortex; or, if the polymer is delivered to the vortex in a non-aqueous medium which is volatile at the water temperature, the rapidly revolving warm water quickly volatilizes the organic materials away from the polymer and simultaneously coats the polymer particles with the repellent agent, thereby substantially preventing access of water to the polymer, even though the water is present in large quantities. The polymer is readily removed from the vortex by many different methods under conditions such that any water also removed, flows away very rapidly, leaving the polymer with amounts of water as low as 1%. Such small amounts of water as 1% are readily removed merely by treatment of the polymer on the roll mill or in the de-watering extruder, thereby avoiding the use of filters, strainers, dryers, and the like; and avoiding also the injury done to the polymer by such mechanical treatment and such heat treatment.

Thus, a preferred form of the invention prepares a cold mixture of isobutylene with a multi-olefin having from 4 to 14 carbon atoms per molecule with a volatile diluent; and polymerizes the mixture at a temperature within the range between −40° C. and −164° C. by the application to the cold mixture of a Friedel-Crafts catalyst in solution in a low-freezing-non-complex-forming solvent to produce a slurry of solid polymer in unpolymerized polymerizate mixture. This slurry is then delivered into a vortex of warm water of good purity; care being taken that the water contains nothing to act as a wetting agent. Simultaneously, there is delivered to the same vortex a supply of material having the properties of adsorption and adhesion onto the surface of the polymer particles, and a very high repellent property for water. This substance preferably is a solid such as zinc stearate but such solidity is not of the essence of the invention since any substance which will adhere to the polymer and repel water is suitable providing that it remains on or near to the water surface, and provided that it does not produce tackiness of the polymer. The warm water in the vortex provides sufficient heat to volatilize out the low-boiling unsaturates from the polymerization mixture and also the catalyst solvent and any diluent which may have been present, to produce a two-layer system in which the practically dry polymer particles float on the surface of the water in the vortex.

The dry polymer particles then are readily separated from the water by any one of a considerable number of methods. If the vortex is maintained in a condition of sufficiently vigorous rotation, the hub of the rotor at the bottom of the vortex which maintains the rotation, may be made hollow and the polymer may be allowed to drop through the hollow shaft of the rotor. This may be made to effect a clean separation between the water and the dry polymer; or a small, steady stream of water may be discharged with the solid polymer, in which case, means for the mechanical separation of the solid polymer and the stream of water are necessary. A trough and strainer are sufficient for this purpose. Alternatively, a considerable range of collecting devices within the vortex may be used. Such devices as a pipe with an elbow will serve to remove the polymer either sidewise through the vortex, or downward through a hollow rotator shaft, or upward under the urge of a current of gas.

The "dry" polymer, as so delivered, may be, in fact, practically dry with a water content well under 1% down to values as low as 0.1%, or it may, under some circumstances, contain amounts of water up to 20% or 25% or even 80% based on dry polymer, depending upon the amount of surface coating agent and its character.

The invention is not limited to the separation of polymer from a volatile solvent suspension or solution, but it works excellently for separation of polymer from a water slurry.

In this embodiment the polymer may be slurried in water in the manner well known in the prior art to volatilize out the unsaturate and prepare a typical water slurry of polymer in which the polymer may be present in from 2% or 3%, (preferably 5%) up to 15% or 20% of the total mixture. Under these circumstances the polymer is, of course, saturated with moisture. Under this alternative embodiment the polymer slurry in water may be added, in the water slurry condition, to a similar vortex (or other smoothly rapidly flowing stream) as above described in which the vortex is provided with a similar supply of water repellent material; especially, as above described, using zinc stearate. Under these circumstances the zinc stearate adheres to the polymer in spite of the high moisture content and the polymer, so coated, rises promptly to the surface of the liquid in the vortex and is readily separated therefrom by any of the methods herein disclosed. Thus, by this alternative embodiment it is possible to separate the polymer from the volatile materials by the procedure of the prior art, throwing the polymer, in suspension in volatiles, into a strongly stirred tank of turbulent warm water to produce the usual, typical, water slurry which may then be treated in the vortex with the water repellent agent to produce the dry polymer particles. Other objects and details of the invention will be apparent from the following description when read in connection with the accompanying drawing, in which Fig. 1 is a view in vertical section of the device according to the present invention, utilizing a water vortex, a stirrer to produce the vortex, a hollow shaft carrying the stirrer, through which the dry polymer may be removed, a slurry inlet and an inlet for the supply of adsorbable water-repellent agent;

Figure 1:
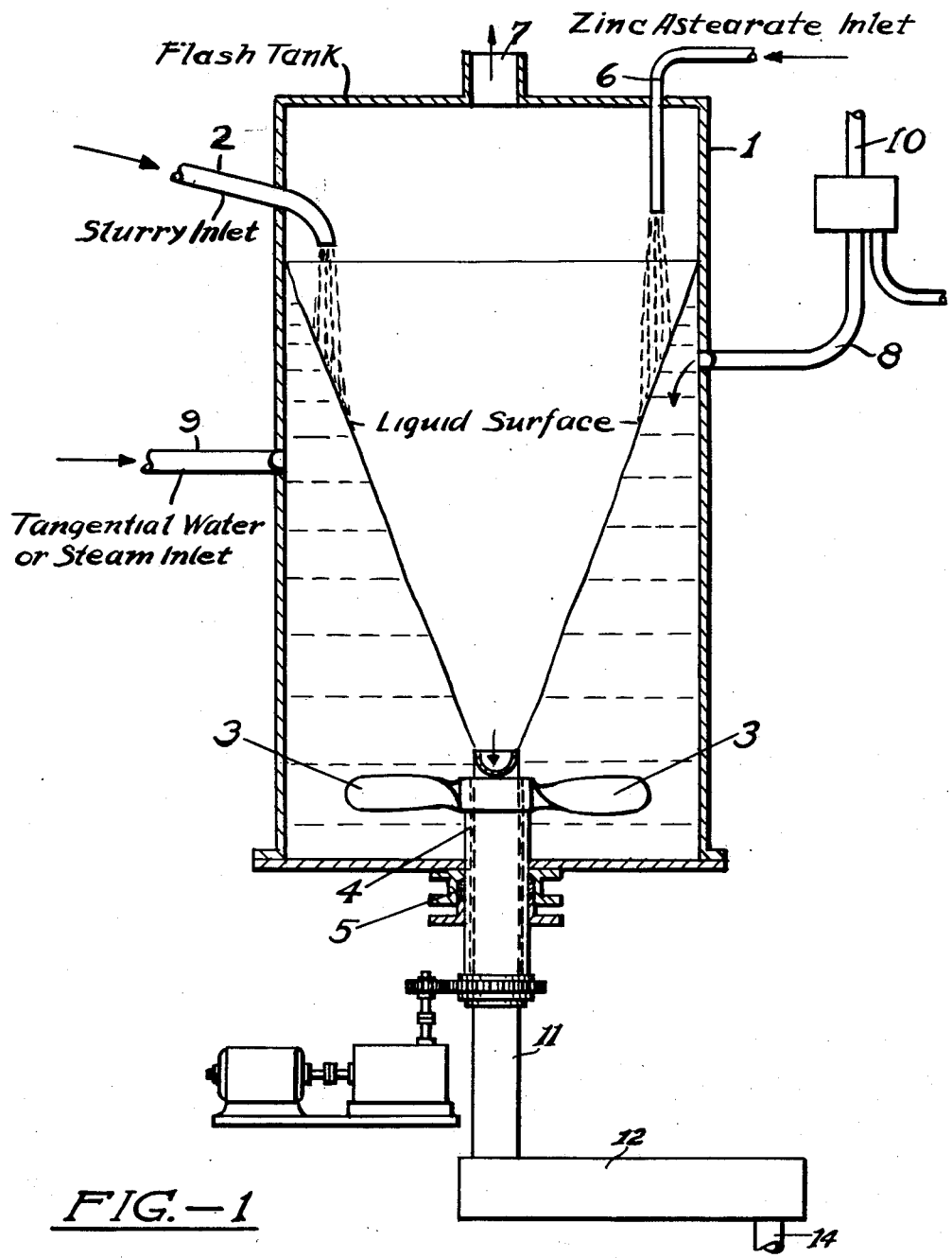

In practising the invention, the raw material is prepared by the steps of mixing together substantial portions of a mono-olefin having from 4 to 10 carbon atoms and a multiolefin having from 4 to 14 carbon atoms and copolymerizing them by the procedure shown in United States Patent No. 2,356,128, conveniently utilizing a polymerization apparatus of the type shown in United States Patents Nos. 2,399,672; 2,401,754 and United States applications Serial Nos. 511,699; 448,575 (now abandoned) and 545,099.

If an elastomer is to be produced, the monoolefin preferably is isobutylene and the multiolefin preferably is a conjugated diolefin having 4 to 6 carbon atoms such as butadiene, isoprene, piperylene, dimethyl butadiene, or a mixture thereof. Alternative multiolefins which can be used include dimethallyl, myrcene, allo-ocymene, or the higher diolefins such as 2-methyl, 3-hexyl butadiene-1,3 or 2-methyl, 3-octyl butadiene-1,3 or 2-methyl, 3-nonyl butadiene-1,3. With the five carbon atom and higher diolefins, it is usually preferable that the polymerizate mixture contain a major proportion up to 99.5% of isobutylene and a minor proportion of the multiolefin.

For most polymerizations it is desirable that the amount of multiolefin range from 0.5% up to about 6 to 10%, since higher proportions, especially with isoprene tend to poison the reaction unduly. However, with other multiolefins amounts ranging from about 0.5% up to 50% may frequently be used; especially with such multiolefins as dimethylbutadiene or with various of the higher multiolefins, especially allo-ocymene, dimethallyl and the 10, 12 and 14 carbon atom compounds. With butadiene, however, a high-grade elastomer is obtainable from mixtures of isobutylene with butadiene ranging from 7% isobutylene to 90% isobutylene, the remaining portions in each instance being butadiene. A similar situation obtains with the diolefin known as dimethylbutadiene which may be better described as 2,3 dimethyl butadiene-1,3. With this compound also, amounts ranging from 1% or less up to amounts as great as 75%, 85% or even 90% may be copolymerized and used in the present embodiment of this invention.

If a hard resin, which is a non-elastomer, is to be produced, some other mono-olefin than isobutylene is required and it is preferably present in minor proportion, the multiolefin being present in a major proportion up to 95%. For the non-elastomer resin, any of the normal olefins having from 3 to 10 inclusive carbon atoms are useful and any of the mono-olefins having from 5 to 10 inclusive carbon atoms per molecule are useful. The above carbon atom numbers for the top range are stated as being those at which tests have ceased; and are in no way to be understood as indicating that mono-olefins having 11 or more carbon atoms are useless or that multi-olefins having 15 or more carbon atoms are useless.

For the purposes of this application, an "elastomer" is defined as was done by Fischer in his article in "Industrial & Engineering Chemistry" for August 1939, page 941; under the title "Nomenclatures for Synthetic Rubbers"; and a "non-elastomer" is defined as a solid in which the elongation at break is less than 5 to 10% with a tensile strength at break above 300 pounds per square inch, usually showing a conchoidal fracture.

Within the scope of the present invention, there is also included the semi-elastomer produced by the copolymerization of isobutylene and the aromatic compound known as styrene, in which the isobutylene may range from 10% to 80%, the copolymerized styrene making up the remainder. In this instance, the styrene may be regarded as a multi-unsaturate, in view of the presence of one typical ethylenic double linkage in the side chain and the typical aromatic unsaturation in the cyclic nucleus. In this polymer, styrene is to be regarded as the first of a series of homologous compounds in which aliphatic substituents may occur either in the aromatic nucleus, or in the olefinic side chain. Thus the compound known as methyl styrene in which there is a methyl group on the 1 carbon of the olefinic substituent is equally useful for the present polymerization reaction. Likewise paramethyl styrene is equally useful; as are the several analogous compounds in which ethyl, propyl, butyl and the like substituents are used. Similarly it is not necessary that the substituent in the nucleus be in the para position to the olefinic substituent but it may be in any of the other positions in the nucleus. Thus the phrase "a styrene" is intended to refer to styrene as such and to the various substituted styrenes which perform similarly. Accordingly, the phrase used in the claims of "a multi unsaturate having from 4 to 14 carbon atoms" is intended to include styrene and its homologues.

In the preparation of the polymers suitable for this embodiment of the invention, the polymerization mixtures of mono-olefin and multi unsaturate may be diluted with a suitable diluent such as ethyl or methyl chloride, or a multi-halo-substituted aliphatic such as methylene chloride, chloroform, ethylene dichloride, ethylene tri or tetra chloride, various of fluorinated compounds, various of the chloro fluoro compounds, various of the lower boiling hydrocarbons, and the like.

It may be noted that the preferred halo substituted aliphatics are the fluorine or chlorine substituted compounds, since relatively few of the bromo compounds have low enough melting points and relatively fewer of the iodine compounds have low enough freezing points; and in addition, the bromine and iodine compounds tend to hydrolize with undue ease yielding interfering compounds. The fluorine compounds, however, are quite stable and up to 6 or 7 carbon atoms are useful for one or another of the various polymerization processes. In addition, various of the aliphatic hydrocarbons such as ethane, propane, butane, pentane and the like up to 9, 10, 11, or 12 hydrogen atoms are similarly useful. For the diluent, it is only necessary that the freezing point of the diluent be at or below the polymerization temperature, or preferably that the freezing point of the diluent-containing mixture be at or below the polymerization temperature, and that the diluent be free from interference with the polymerization reaction, that is, that it does not copolymerize with the olefinic material and that it does not interfere with the catalyst. Accordingly, the diluent may have carbon atom numbers within the range about 1 and 10 carbon atoms per molecule.

The cold mixture is preferably polymerized by the application thereto of a Friedel-Crafts catalyst in solution in a low-freezing, non-complex-forming solvent. For the catalyst, the preferred substances are aluminum chloride or titanium tetra chloride or boron trifluoride, or the like; any of the Friedel-Crafts catalysts disclosed by N. O. Calloway in his article on "The Friedel Crafts Synthesis" printed in the issue of "Chemical Reviews" published for the American Chemical Society at Baltimore in 1935, in volume XVII, No. 3, the article beginning on page 327, the list being particularly well shown on page 375, being suitable and useful. In addition, many Friedel-Crafts metal double salts are useful, including such substances as aluminum chloro bromide, aluminum chloro-alk-oxide, and a wide range of similar compounds. Boron trifluoride may, in some instances, be used directly as a gas by bubbling through the cold reaction mixture. Similarly, titanium tetra chloride may be used as a liquid, stirred vigorously into the reaction mixture. However, the catalyst is preferably used in solution in a low-freezing, non-complex-forming solvent.

For the purposes of this disclosure, any solvent having a freezing point below 0° C. is low-freezing, and any solvent which does not cause to separate from the solution, upon evaporation of the solvent, a compound between the solvent and the Friedel-Crafts catalyst, is non-complex-forming. Or, as shown by Findley in "The Phase Rule and its Application" (sixth edition, Longmans Green and Company, New York), the solvent is non-complex forming when the addition of the solvent in the form of a vapor to the catalyst at constant temperature will lead to a substantially continuous change in the composition of the catalyst phase and to a continuous increase in the partial pressure of the solvent. In general, the catalyst can be recovered unchanged by removal or volatilization of the solvent without substantial change in temperature.

The catalyst solution may be applied in the form of a fine, high pressure jet into the body of the rapidly stirred, cold olefinic mixture, especially if it is used in an overflow type of continuous reactor. Alternatively, the liquid catalyst may be applied in the form of a finely divided spray or a fine jet onto the surface of the rapidly stirred, cold, olefinic material.

The reaction proceeds rapidly to form the desired polymer which, being an elastomer, will show a molecular weight preferably within the range between 20,000 and 80,000 (as determined by the Staudinger method) and may occasionally show a Staudinger molecular weight number as high as 250,000 (or if simple polyisobutylene is made, as high as 500,000). If a non-elastomer resin is made, the molecular weight usually will lie in the range between 500 or 1000 and 20,000, 30,000 or 40,000, depending upon the materials used, the potency of the catalyst, and the polymerization temperature.

The reaction is preferably conducted in a continuous reactor, as shown by U. S. Patents # 2,399,672 and # 2,401,574 or in U. S. application S. N. 511,699, now U. S. Patent 2,463,866, in which the cold reaction mixture is delivered to a refrigerated, jacketed reactor equipped with a powerful circulating stirrer, and the catalyst solution is delivered under pressure into the body of the rapidly stirred, rapidly circulating mixture, the reactor being filled completely full, and an overflow discharge then taken through a top outlet. Alternatively, a partly filled, batch reactor equipped with a powerful stirrer may be used, successive batches being dumped through an appropriate drain.

This apparatus and process, as shown, produces the raw material for the present invention in the form of a mixed slurry and solution of polymer in a diluent together with some unpolymerized monomers and the catalyst solvent. This slurry, as shown in Fig. 1, is delivered through an outlet pipe which leads to the tank member 1 via the slurry inlet 2. At the bottom of the tank 1, there is provided a stirrer 3 carried upon a hollow shaft 4, which, in turn, is driven by a suitable source of power (not shown). The shaft 4 conveniently passes through a packing gland 5. There is also provided a delivery tube 6 through which a supply of the polymer-adherent, water-repellent material is delivered. The vent 7 carries away the volatilized monomers, diluent, catalyst solvent, and the like. There is also provided an overflow outlet 8 which serves to limit the amount of water present in the vortex, and there is also provided a tangential inlet 9 for the delivery of additional warm water or water and steam, as desired. The shaft 4 may be continued by a pipe 11 leading to a conveyor means 12 which may be merely an inclined chute or may contain a chain or worm conveyor or other transfer means. The polymer delivered to the chute 12 may be transferred through an outlet 14 to any convenient removal device. For this purpose an extruder is particularly convenient since it delivers solid threads of polymer and prevents the loss of volatiles separated from the slurry. Alternatively, however, the outlet 14 may lead directly to a double roll mill with the dry polymer delivered to the bite of the rolls, in which a revolving bank of polymer is produced and a layer of calendered polymer is formed on the front roll from which it may be stripped off and delivered to a second mill, if desired, or may be cooled and delivered to a packing station. In either event, the milling operation drives out the last trace of moisture and produces a completely water-free, dense, consolidated sheet of polymer.

In the operation of the invention, the polymerization system is put into operation in the usual way and operation continued until the supply of polymer in cold polymerizate liquid overflows from the reactor outlet. Simultaneously, the tank member 1, as shown in Fig. 1, is partly filled with an appropriate amount of warm water or with water brought up to temperature with steam. For this purpose, a temperature within the rang between about 100° F. to about 185° F. or preferably 125° F. to 175° F. is maintained. Lower temperatures due not volatize the low boiling carbonaceous materials rapidly enough to be commercially satisfactory and higher temperatures yield an undesirably large amount of water vapor in the effluent gases. When the tank 1 contains sufficient water at a suitable temperature, the stirrer 3 (having a high pitch) is operated with a slight upward thrust to produce the desired vortex. The speed of operation of the stirrer 3 may range between about 150 R. P. M. and 2500 R. P. M., depending upon the size of the tank, the amount of water present, the character of the polymer introduced, the character of the adsorbed water-repellent agent and many other factors. However, for most conditions, a speed of rotation in the range between 600 and 1000 R. P. M. is satisfactory. It may be noted the speed of rotation to be used depends to a large extent, not on the dimensions of the polymerizer, but upon the pitch, dimensions and other characteristics of the stirrer. It is desirable that a smooth vortex with as steep sides as is feasible, be produced, and that as little turbulent flow as possible be produced. That is, it is desirable to have a smooth flow with as great a freedom from turbulence as possible in order to avoid stirring the polymer into the vortex water, yet at the same time to obtain as rapid a heat transfer between the warm water and the cold polymer slurry and as rapid a transfer of the water repellent substance from suspension in the water to absorption upon the surface of the polymer particles as possible. When the vortex is properly formed, the supply of adherent water-repellent agent is started until the inner surface of the vortex carries upon it a substantial amount of the agent. When this stage is reached, the vortex is ready for delivery thereto of polymer slurry.

The polymer slurry distributes itself over the surface of the vortex, and, to some extent, up the sides of the tank 1. The relatively high temperature of the water causes, the volatilization of the carbonaceous liquids present, and, at the same time, stirs into the polymer slurry a substantial quantity of the water-repellent agent. The agent is rapidly picked up by the surface of the polymer particles, and it adheres thereto, yielding on each particle of polymer a highly water-resistant, water-repellent surface. As the carbonaceous liquids are volatilized, the solid polymer rests upon the water surface and tends to distribute itself more or less uniformly upon the surface under the influence of the centrifugal force produced by the whirling vortex. Some, of course, works downward on the vortex to the stirrer and a substantial portion of this material will work downward through the hollow shaft 4 and the pipe 11 to some extent under the influence of gravity and to some extent under the drive of a small stream of volatilized gas. This substantially dry solid polymer is collected in the trough 12 and delivered through the outlet 14 to the mill, as above outlined. As the water in the tank is cooled by the volatilization of the carbonaceous liquids, fresh supplies of hot water or steam are delivered through the pipe 9 and the surplus water overflows through the pipe 8 and the constant level device 10, as shown, from which the water may be delivered to a storage tank for reheating and return to the vortex. This procedure of reheating is usually helpful, since it avoids loss of water-repellent agent and avoids loss of any particles of polymer which may be entrapped in the water. This sequence of steps may be continued as long as the polymerizer operates satisfactorily. When the polymerizer is shut down for cleaning or other purposes, the tank 1 and its associated members also may be subjected to drainage and cleaning, if necessary.

It should be noted that the rate of rotation of the liquid vortex in the tank 1 is quite high, and that the slurry of polymer comes in at a relatively very low speed. Accordingly, there is a relatively great difference in speed of rotation between the polymer slurry as it distributes itself across the vortex surface and the water in the vortex. This difference in rate of travel between the two components serves to give a rapid break-up of the polymer slurry into relatively very fine particles, and serves to incorporate the anti-wetting agent off of the surface of the vortex into the polymer slurry at a rapid rate. In consequence, relatively small particles of polymer are produced, each well coated with water-repellent agent, thereby maintaining the dryness of the polymer particles.

It should further be noted that the type of movement of the water in the vortex is quite important. It should be a true vortex with a minimum of turbulence, so that the water surface in the vortex is as smooth and unbroken as possible to avoid unduly rapid dispersion of polymer particles into the water. A smooth vortex surface gives a rapid rolling and turning effect upon the polymer slurry with a minimum of tendency to mix water and slurry. In contrast, turbulence in the vortex mixes up the water and the slurry before the particles can be satisfactorily covered with water-repellent agent, thereby wetting a substantial portion of the polymer particles and producing a slurry of polymer in water which is undesirable. For most purposes, a surface speed at the middle of the vortex ranging between 500 and 1500 ft. per minute is desirable, since this range can be obtained without undue turbulence and it is sufficiently high to produce rapid incorporation of water-repellent agent onto the polymer particles.

It may be noted that, in most instances, the polymer per se has a lower density than water and accordingly tends to float on the vortex surface; and, in any event, there usually is a sufficient amount of residual carbonaceous gas in crevices in the polymer particles to insure floating upon the surface, and accordingly, there is produced a sharp separation of dry, water-repellent polymer upon the surface of the warm water vortex.

As above pointed out, the preferred water-repellent agent is zinc stearate, and this soap is particularly desirable because of its stability, and because of the helpful effect of both zinc compounds and stearates in the compounding of rubber-like polymers. Alternatively, however, such compounds as aluminum stearate, calcium stearate, magnesium stearate, cadmium stearate, and the like may be used. These are representative of the metals from groups 2 and 3 of the periodic table having molecular weights between 20 and 140, all of which are usable, although, of course, in group 3 only aluminum is commercially important, the others being rare. It is not necessary that the stearic radical be used, but in these compounds the stearic acid radical may be replaced by any of the other aliphatic acids having from 9 to 30 carbon atoms, representative substances being lauric, capric, myristic, palmitic, and melessic acids, as well as araphitic acid or n-icosanic acid having 20 carbon atoms, and hyenic acid or n-pentacosanic acid having 25 carbon atoms, and also n-triacontanic acid having 30 carbon atoms. It also is not necessary that the organic acid be saturated since oleic and linoleic acids and other members of the same families having from 10 to 30 carbon atoms are also usable. It is not even necessary that the alkyl acids be used, since the aromatic acids of the type of phenyl propionic acid are also usable, and, for some purposes, zinc, magnesium and lead naphthenates, which serve as dryers and catalytic hardening agents in subsequent uses of the polymer. This is particularly true of the resin substances as distinguished from the elastomers, when the resins are used in varnish formulae or as moulding materials. It may be noted that the polymer so treated retains its water-repellent character through a considerable number of additional steps and the polymer, once it has been made water-repellent, may be converted into an aqueous slurry suitable for handling in pipes, troughs, and the like, by high turbulence type of agitation or water flow from which the polymer is readily recovered in dry form merely by settling or straining. Accordingly, the polymer delivered from the pipe 11 may be dropped into the tank containing water in strongly turbulent agitation, and the whole drained through pipes or troughs to other processing equipment or to storage or for other purposes. This water-repellent character is readily retained for a considerable length of time and through many processing steps, so long as the polymer is not compacted into a dense sheet.

Figure 2:
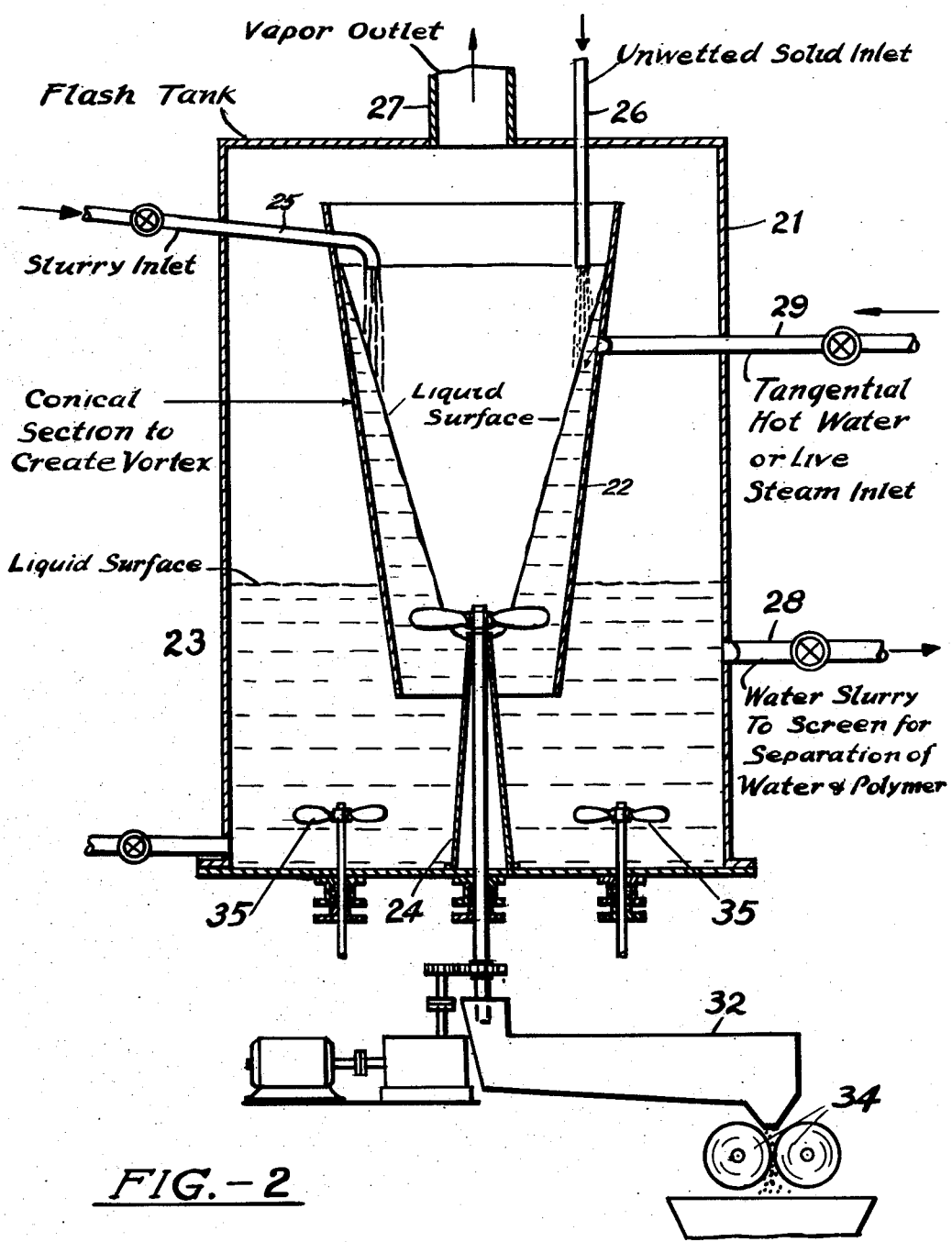
Fig. 2 is a modification of Fig. 1, in which the vortex is produced within a conical structure inside of a larger tank containing reserve quantities of warm water.

It is not necessary that the vortex fill the entire tank member. Instead, the vortex may be produced within the interior of a separate cylinder or liner positioned within a larger tank, as is shown in Fig. 2. In this figure, a tank 21 is provided having within it a conical cylinder 22 carried by appropriate supports from the walls of its tank 21. A similar stirrer 23 is provided carried upon a shaft 24 which may be hollow, as in Fig. 1. The slurry inlet 25 is carried through the tank 21 and through the vortex cylinder 22, to deliver the slurry upon the surface of the vortex in the same way as in Fig. 1, and a similar supply tube 26 for the delivery of water-repellent agent is provided. In this embodiment also a vapor outlet 27 is provided and a water outlet 28. The outlet 28 may be equipped with a control valve or with a constant level device, as desired. A supply tube 29 for steam or hot water is also provided, and the polymer may be delivered to a trough member 32, discharging through an outlet 33 to a similar roll mill 34. There may, if desired, be provided in addition auxiliary stirring devices 35 to maintain adequate circulation of the water in the tank 21.

The operation of this embodiment is substantially identical with the operation of the embodiment of Fig. 1.

Figure 3:
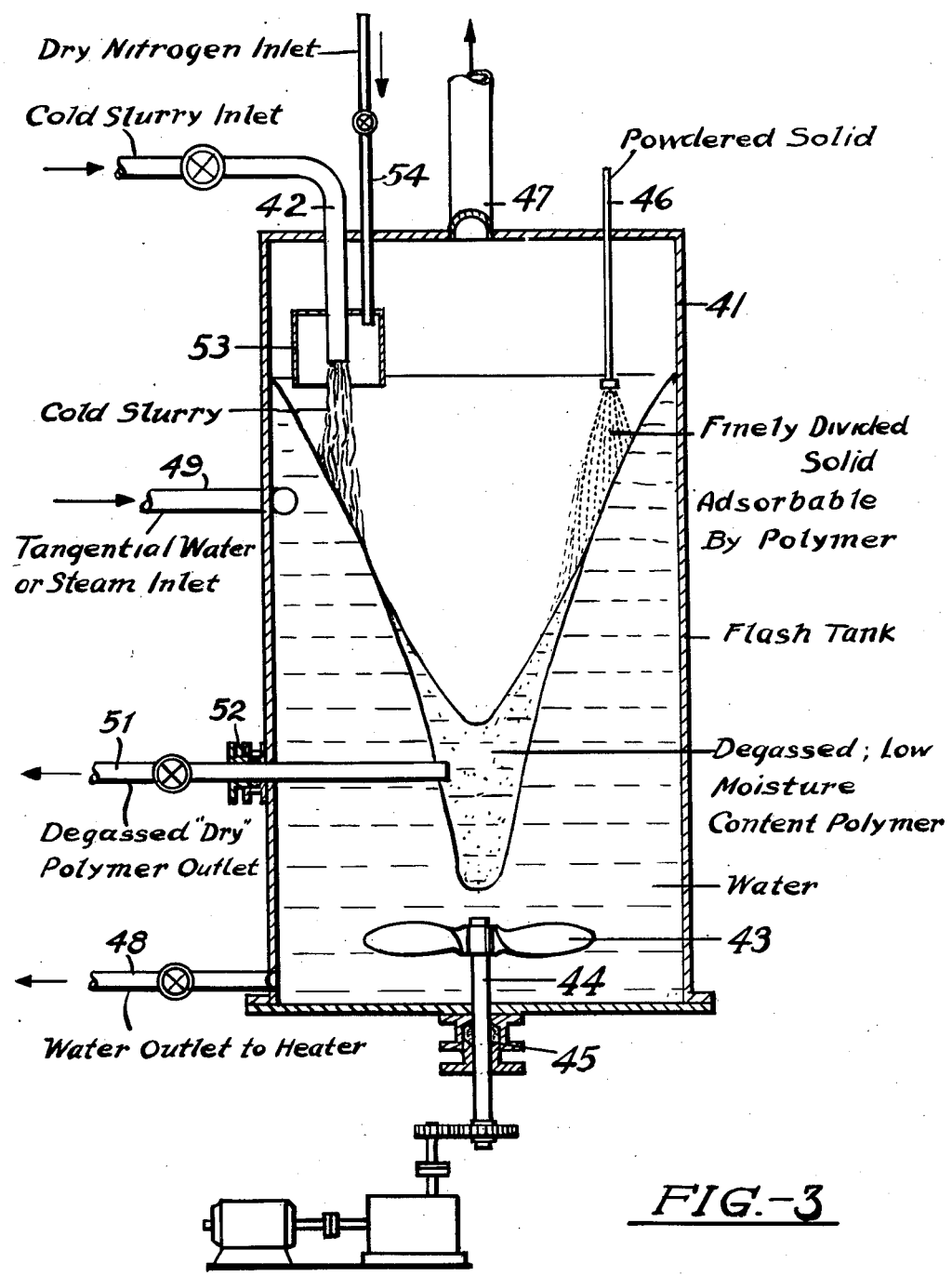
Fig. 3 is a view in vertical section of an alternative embodiment utilizing a side tube for withdrawal of the dry polymer.

In some instances, it may be undesirable to remove the dry polymer through a hollow stirrer shaft. Accordingly, the embodiment of Fig. 3 may be used. In this embodiment there is provided a tank member 41 having another duct 42 for the polymer slurry. There is also provided a stirrer 43 as in Figures 1 and 2 mounted upon a shaft 44 passing through a packing gland 45. There is similarly provided a duct 46 for the delivery of the water-repellent agent to the surface of the vortex and an outlet 42 for volatilized gases. A water outlet 48 with a constant level device is provided as in Examples 1 and 2 and a supply of hot water or steam 49 to maintain the volume and temperature of the vortex is likewise provided. The shaft 44 is made solid, as shown. There is then provided a pipe member 51 entering the tank 41 through a packing gland 52 to permit of radial adjustment. The tube 51 may be simply a cylindrical tube or it may be made in streamlined section, as desired, the streamlined section being preferable, however, because it produces much less turbulence in the vortex. The pipe 51 is suitable for adjustment to pass entirely through the vortex and into the layer of polymer formed upon the surface of the vortex. This position is readily ascertained by observation of the amount of water delivered from the outlet end of the tube 51.

Figure 4:
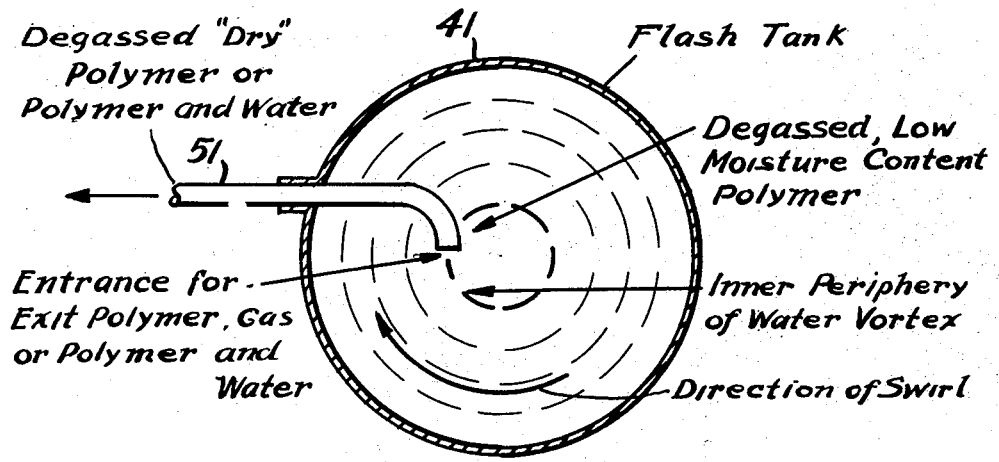
Fig. 4 is a view in horizontal section of the embodiment of Fig. 3.
Figure 5:
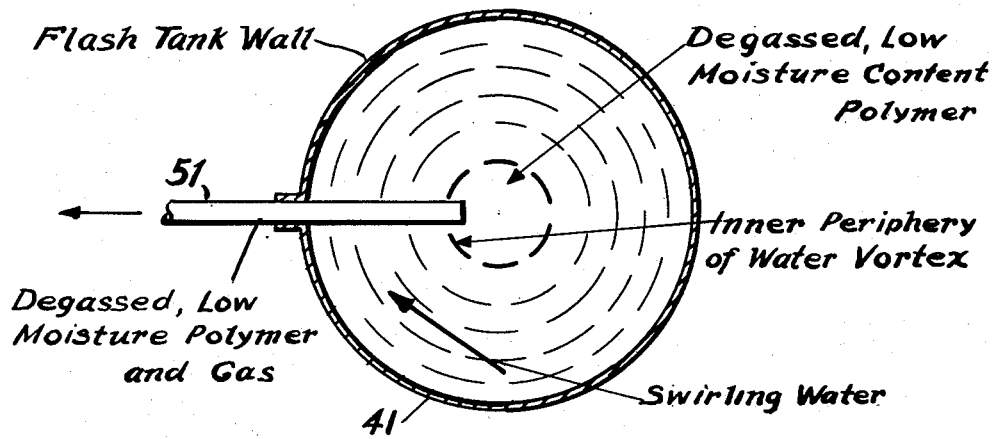

The tube 51 may terminate in a square end, as shown in Fig. 5 or may terminate in a bend, as shown in Fig. 4. In the embodiment of Fig. 5, the polymer is conveniently carried through the pipe 21 by a small flow of water or a small flow of gas from the volatilized components of the slurry. In the embodiment of Fig. 4, the rotational pressure of the slurry is sufficient for a rapid discharge of polymer.

In some instances, also, difficulty is encountered in the delivery of the cold slurry to the vortex since there is present in the tank member 1, 21 or 41 a relatively high vapor pressure of water which tends to freeze on the pipes 2, 25 and 42. To prevent this difficulty, the pipes 2, 25 or 42 may be surrounded at the end by a cap member 53 supplied through a pipe 54 with a fixed gas such as nitrogen or methane or, in some instances, carbon dioxide. The presence of this fixed gas within the hood 53 prevents access of water to the end of the pipe 42 and prevents frosting, which, in some instances, is urgently necessary.

The embodiments above described show the delivery of a cold slurry of polymer in low boiling hydrocarbons or analogous material into the vortex in water. The invention is not, however, limited to this particular form since it is equally applicable to the separation of such polymers from water slurry. In this embodiment the slurry of polymer in water may be added to an analogous vortex of water containing the water repellent material. In this embodiment it is often convenient to deliver the polymer into water to produce a suitable slurry in water. This slurry in water may then be separated by the procedure of discharging the water slurry onto a vortex in which the water repellent material is provided as before. By this alternative procedure, it is thus possible to prepare a slurry of the polymer in water and then recover that polymer from the water slurry by a dual or two-step procedure rather than by the single-step procedure outlined in the previous embodiment.

Also the procedure is not limited to these particular low temperature copolymers since it is applicable to many other forms of polymer under many other circumstances whether the polymer is to be recovered from a water emulsion or water slurry or from other forms of slurry and conditions.

Also the invention is not limited to the use of vortex conditions since the essence of the invention consists in the delivery of the polymer slurry onto a rapidly flowing smooth stream of water. For this purpose, as an alternative embodiment to the vortex, a smoothly flowing stream of water preferably in a trough which may be straight or curved and set at such an angle of slope as to give a reasonably rapid flow with a minimum of turbulence, may be used. In this embodiment the flowing stream of water, with as little turbulence as possible, is first established and the slurry of polymer either in water or in volatile components is discharged onto the top of the smoothly flowing stream of water after a suitable amount of the water repellent agent has been incorporated into the water of the smoothly flowing stream, or onto the surface of the stream as desired. This embodiment likewise produces an excellent separation of polymer from the original slurry. The relatively rapid rate of speed of flow of the water stream and the relatively slow rate of flow of the polymer slurry delivered onto it results in a rapid turning motion in the stream of polymer slurry which rapidly volatilizes the solvents, the unpolymerized monomers and the like to produce an excellent dense slurry which at the same time has the particles of water repellent material incorporated onto the surface of the polymer. The difference in relative speed of travel of the flowing stream of water and the stream of polymer slurry results in a rapid interchange of heat and of the water repellent agent and yields at the end of the stream an excellent dry solid floating on the top of the stream of water. The stream of water and surface layer of polymer are readily separated merely by a strainer or sieve and the water may be returned to the inlet end of the chute ready for reuse. The requirements with respect to speed and the like on this flowing stream are closely the same as the requirements in the vortex, that is a surface speed of from 500 to 1500 feet per minute being suitable. This is readily obtained by an appropriate angle of slope of the trough. The trough may be set at a suitable angle so that the normal downward flow of the water will give the necessary speed, or appropriate jets or other carrying means may be used to maintain the desired rate of stream flow. The trough may be straight or curved as desired and either form is entirely satisfactory.

The first several embodiments outlined in this specification show the use of a comparatively deep-sided vortex obtained by a stirrer at the apex of the vortex cone. Many other means of obtaining such a vortex will be obvious to those skilled in the art. For instance a good jet of water entering tangentially to the circumference of the tank in which the vortex is to be formed is quite satisfactory, a relatively moderate amount of water under fairly high pressure being quite adequate. Alternatively several smaller streams may be used. Likewise, it is not necessary that a steep-sided narrow vortex be used since equally good results are obtainable with a relatively slower moving vortex, flatter in character, in a larger container.

Thus the essence of the invention is found in the combination of a rapidly flowing, smooth, non-turbulent water surface containing in and on the surface substantial quantities of a water-repellent agent which has an affinity for the polymer; upon which the slurry of polymer is deposited under conditions which permit of rapid vaporization of low boiling components and the rapid incorporation into the polymer of the water-repellent substance to make the polymer as water-repellent and water-resistant as possible and cause it to float on the stream of water in a nearly dry condition. The following examples will show the details of a suitable embodiment of the invention.

EXAMPLE 1

A flash tank, set up according to the prior art, was used for comparative tests. This flash tank, was about half-filled with warm water, equipped with a propeller stirrer at the bottom, driven at approximately 800 R. P. M. and provided with vanes in the interior to give a baffled flow condition in the tank so as to permit of rapid circulation of the water upward in the center and downward at the side (or the reverse as desired).

Simultaneously, a mixture was prepared consisting of 100 parts of isobutylene and 5 parts of isoprene (by weight) which mixture was placed in a reactor and diluted with 3 times its volume of methyl chloride cooled to a temperature of approximately −103° C. by the use of liquid ethylene in a refrigerating jacket upon the reactor. A copolymer was produced by the addition to the mixture of a solution of aluminum chloride in methyl chloride containing approximately 0.3 gram of aluminum chloride per 100 cc. of methyl chloride. Approximately one-half volume of this catalyst solution was added although there is no fixed amount of catalyst required, but the amount varies over a very wide range depending upon the purity of the reactants and many other factors. The polymerization was carried to approximately 60% yield on the amount of isobutylene present and the resulting slurry and partial solution was discharged from the reactor into the flash tank containing the warm water rapidly and turbulently stirred and circulated by the propeller stirrer with strong turbulence produced by the presence of the baffles. The polymer was allowed to remain in the flash tank until substantially all of the volatiles were driven out. The tank contents were then discharged onto a screen to remove the excess water and it was found after drying to constant weight, that the polymer as removed from the screen had contained 106% of water, based on the amount of dry polymer present. Such an amount of water is representative and characteristic of the prior art but is extremely difficult to remove from the polymer since it requires elaborate drying steps, first a tunnel drying step to remove as much as possible of the water; then treatment in a powerful extruder to bring the polymer temperature well above the boiling point of water to drive out most of the remainder, then drying on a double roll mill again at temperatures well above the boiling point of water to drive out the last traces of moisture. Such treatments are expensive and injurious to the polymer since they tend strongly to break down the polymer molecular weight and to injure its tensile strength after curing.

The baffles were then removed from the flash tank and the propeller rotated at approximately 800 R. P. M. Under these conditions with no baffles in the tank, a smooth vortex was obtained substantially free from turbulence. The polymerization was repeated with a similar quantity of mixture of the same constitution with the same catalyst in the same strength and amounts of methyl chloride. The slurry of polymer in unreacted unsaturates and diluent was then dropped into the vortex in a moderately rapid stream. The temperature of the water in the vortex was between 134° F. and 152° F., and it contained 3% of zinc stearate particles of as fine a size as possible, suspended in the water (3% of zinc stearate on the total amount of polymer to be processed). When the volatiles were all driven off, the stirrer was stopped, allowing the vortex to subside. It was found that the polymer floated much higher on the surface of the water than in the normal set-up as previously outlined, and the polymer when strained out from the water was found to contain only 1.3% of water based on the total amount of polymer present. An amount of water as small as 1.3% is relatively quite easy to remove since it can be volatilized out either by an extruder or even merely on the roll mill, leaving a polymer containing no measurable traces of moisture.

EXAMPLE 2

A similar polymerization mixture was prepared and polymerized as in Example 1 and when polymerization was substantially complete, the slurry of polymer in diluent and residual unsaturates was discharged to the flash tank as in Example 1 with the exception that the stirrer was rotated only at 690 R. P. M. This resulted in a flatter and less satisfactory vortex and upon test the polymer was found to contain 4.3% of water. This amount of water is not too much for convenient removal by either an extruder or on the roll mill but it is higher than is desirable. However, in contrast to the 106% of moisture obtained under conditions of turbulence in the flash tank, the difference is one of order of magnitude and a very great improvement.

EXAMPLE 3

A similar polymerization mixture was prepared and polymerized as in Example 1; and discharged to the same flash tank with a similar vortex, but with the propeller rotating at about 1190 R. P. M. The resulting polymer when strained away from the water was found to contain 27% of water, suggesting the probability that at 1190 R. P. M. there was sufficient turbulence in the water to give a considerable amount of turbulent dispersion along with the vortex separation as effected according to the present invention. It was noted that a propeller speed of 1190 R. P. M. gives a peripheral velocity on the water substantially above the 1500 feet per minute previously indicated as a desirable top limit. In this instance there was also present approximately 3% of zinc stearate in terms of the amount of polymer dried.

EXAMPLE 4

A similar polymerization was conducted as in Example 1 and the resulting polymer slurry in methyl chloride and unreacted monomers was discharged into the same flash tank containing the same vortex produced by a propeller speed of 800 R. P. M. Instead of using zinc stearate, however, approximately 3% of aluminum stearate was used. The vortex acted very much as in Examples 1 and 2 but the polymer as recovered was found to contain approximately 62% of moisture. While this is higher than is desirable, the fact that this relatively low water value can be obtained with aluminum stearate is highly advantageous, since in many instances zinc is undesirable, especially when the polymer is to be used as a food wrapper or comes in contact with food or a person's skin as may be the case with package wrappers or hospital sheeting or household fabric or the like.

EXAMPLE 5

A similar polymerization was conducted as in Example 1 and the slurry of polymer in diluent and unreacted monomers was delivered to the same vortex with the propeller operating at approximately 800 R. P. M. but instead of zinc stearate or aluminum stearate, approximately 4% of calcium stearate (based on the amount of polymer present in the water) was used. The vortex acted substantially as before with the exception that the polymer when strained away from the water was found to contain approximately 75% of water. Again this value is higher than is desirable, but since it permits the use of calcium stearate rather than zinc stearate, it again shows the advantages of the procedure where zinc is undesirable.

EXAMPLE 6

A procedure similar to that in Example 1 was carried through, polymerizing the olefinic monomers in the same way and delivering them into a flash tank containing baffles with a stirrer rotating at 1150 R. P. M. to produce a typical water slurry of the prior art. This water slurry showed as before, approximately 100% of water present in the strained solid polymer. The polymer with its contained water was collected from the flash tank and the baffles were removed from the tank. The stirrer was then run at a speed of approximately 840 R. P. M. to produce a vortex of water in the flash tank at a temperature of approximately 140° F. To this vortex there was then added approximately 6% of zinc stearate based on the amount of polymer recovered from the polymerization step, and the wet polymer was distributed on the surface of the vortex. As before the polymer rose much higher in the vortex and after draining away the water, it was found that the sample contained only 13.4% of moisture (based on the amount of dry polymer). This procedure shows the effectiveness of the vortex in the presence of merely damp slurry as a means for reducing the water content of polymer which has previously been separated from the volatiles by the procedure of strongly turbulent flow in a flash tank.

The results are well shown in the following Table I.

TABLE I

*Examples on preparation of dry slurries in a vortex* [1]

| Example No. | Slurry Stabilizer | | Agitation | | Temp. of Water, °F. | Cold Slurry Conc., g./100 cc. | Rate of Slurry Addition, cc./min. | Per Cent Moisture in Polymer |
|---|---|---|---|---|---|---|---|---|
| | Kind | Per Cent Based on Polymer | Rate, R. P. M. | Type | | | | |
| 1 | Zinc Stearate | 2.5 | 800 | Turbulent | 140 | [2] 10 | 400 | 106.0 |
| | do | 3 | 840 | Swirl-Vortex | 152–134 | [2] 19 | 500 | 1.3 |
| 2 | do | 3 | 690 | do | 153–134 | [2] 19 | 475 | 4.3 |
| 3 | do | 3 | 1,150 | do | 152–135 | [2] 19 | 450 | 27.2 |
| 4 | Aluminum Stearate | 4 | 800 | do | 150 | [3] 10 | 450 | 62.0 |
| 5 | Calcium Stearate | 4 | 800 | do | 145 | [3] 10 | 400 | 75.0 |
| 6 | Zinc Stearate | 3 | 1,150 | Turbulent | 155–136 | [2] 17 | 600 | 70.9 |
| | do | 6 | 840 | Swirl-Vortex | 140 | [4] | | 13.4 |

[1] The flashing of the cold slurry and the dewatering of the water slurry was accomplished in a 4.5″ diameter cylindrical vessel 10 inches deep. The agitation was maintained by a 3″ marine type impeller rotating to give an updraft thrust as well as rotation of the fluid.
[2] The cold slurries were prepared in a five liter batch reactor with reactants composed of 100 parts of isobutylene and 5 parts of isoprene. The reactants were diluted with 3 volumes of methyl chloride and then polymerized with an aluminum chloride catalyst dissolved in methyl chloride.
[3] Same as in (a) except that the feed had 4 parts of isoprene and 100 parts of isobutylene.
[4] The water slurry from first half of Example 6, in which the polymer contained 70.9 per cent of water was used in place of the cold slurry.

Thus the process of the invention provides a smoothly flowing stream of water at a surface speed within the range between 500 and 1500 feet per minute containing a substantial amount of a difficultly wettable substance which is adherent to the polymer, such as zinc stearate, calcium stearate, or the other substances listed; to which there is then added the polymer in either water slurry or in wet conditions or as a slurry in the unpolymerized unsaturates and diluent as received from the cold polymerization step, the rapidly flowing non-turbulent water stream with the anti-wetting agent serving to separate the polymer effectively from the liquid in which it is slurried to produce a dry polymer having a much lower water content than is obtainable by any other separation means, thereby greatly reducing the difficulty of drying the polymer, avoiding the necessity for a drying oven and reducing the amount of working which must be had in the extruder or on the double roll mill and at the same time yielding a very much better polymer with much less molecular breakdown and a better spread of molecular weight values in the resulting polymer.

While there are above disclosed but a limited number of embodiments of the process and apparatus of the invention it is possible to provide still other embodiments without departing from the inventive concept herein disclosed and it is, therefore, desired that only such limitations be imposed upon the appended claims as are stated therein or required by the prior arts.

The invention claimed is:

1. In a polymerization process for the separation of a solid polymer from a slurry of polymer in unpolymerized material, the improvement which comprises discharging said slurry onto a vortex of water heated to a temperature between 100° F. and 185° F., the said vortex having a non-turbulent inner surface containing a water insoluble soap of an organic acid having from 9 to 30 inclusive carbon atoms per molecule and a metal selected from groups 2 and 3 of the periodic table having a molecular weight within the range between 20 and 125, whereby the unpolymerized material is volatilized from the mixture and the soap is adsorbed onto the polymer to yield a nearly dry water repellent mass of polymer particles floating upon the surface of the water vortex, and separating the polymer particles from the vortex.

2. In a polymer recovery process the steps in combination of forming a vortex of water having a substantially non-turbulent inner surface moving at a peripheral speed within the range between 500 and 1500 feet per second, the water being free of any wetting agent, adding to the said water vortex a substantial amount of a water repellent salt of a metal selected from groups 2 and 3 of the periodic table having a molecular weight within the range between 20 and 125, in combination with an organic acid having a carbon atoms number within the range between 9 and 30, warming the water in the vortex to a temperature within the range between 125° F. and 175° F., utilizing the sensible heat of the water to volatilize out low boiling materials from a polymer slurry dropped onto the said vortex, and utilizing the rolling and turning action of the smoothly flowing vortex to incorporate into the polymer particles the metal salt to make them water repellent, thereafter permitting the polymer particles to float upon the surface of the water vortex, and separating them in nearly dry conditions from the vortex.

3. In the process described in claim 2, the use of zinc stearate as the soap.

4. In the polymer process according to claim 2, a polymer comprising a major proportion of isobutylene and a minor proportion of a conjugated diolefin having from 4 to 6 inclusive carbon atoms per molecule.

5. In a polymerization process for the separation of a solid polymer prepared by the steps of mixing together a major proportion of isobutylene with a minor proportion of a multi-olefin having from 4 to 14 inclusive carbon atoms per molecule, cooling the mixture to a temperature within the range between −40° C. and −164° C. and adding to the cold mixture a Friedel-Crafts catalyst in solution in a low-freezing, non-complex-forming solvent; the steps comprising delivering the polymerizate mixture to a water vortex having an essentially non-turbulent inner surface and heated to a temperature between 125° F. and 175° F., the vortex containing, in the absence of a wetting agent, a water insoluble soap of an organic acid having from 9 to 30 inclusive carbon atoms per molecule and a metal selected from groups 2 and 3 of the periodic table having a molecular weight within the range between 20 and 125, the slurry of polymer being discharged onto the vortex of water and caused to combine with the soap to yield a nearly dry water-repellent mass of polymer particles and withdrawing the nearly dry polymer particles from the water vortex.

6. In a polymer recovery process for a polymer prepared by the steps of mixing together a major proportion of isobutylene with a minor proportion of isoprene, cooling the mixture to a temperature within the range between −40° C. and −164° C. and adding to the cold mixture an aluminum chloride catalyst in solution in a low-freezing, non-complex-forming solvent to form an organic slurry of polymer; the steps in combination of forming a vortex of water having a non-turbulent inner surface moving at a peripheral speed within the range between 500 and 1500 feet per second, the water being free of wetting agent, adding to the said water vortex a substantial amount of zinc stearate, warming the water in the vortex to a temperature within the range between 125° F. and 175° F., delivering the organic polymer slurry onto the surface of the vortex, utilizing the sensible heat of the water to volatilize out low boiling materials from the polymer slurry dropped onto the said vortex, and utilizing the rolling and turning action of the smoothly flowing vortex to incorporate the zinc stearate into the polymer particles to make them water repellent, thereafter permitting the polymer particles to float upon the surface of the water vortex, and separating them in nearly dry condition from the vortex.

7. A process according to claim 2 wherein the water repellent salt is a soap of stearic acid.

8. A process according to claim 2 wherein the water repellent salt is a soap of oleic acid.

9. A process according to claim 2 wherein the water repellent salt is calcium stearate.

10. A process according to claim 2 wherein the water repellent salt is alminum stearate.

HOWARD L. WILSON.
ROBERT F. LEARY.
JOSEPH F. NELSON.

REFERENCES CITED

The following references are of record in the file of this patent:

UNITED STATES PATENTS

| Number | Name | Date |
| --- | --- | --- |
| 2,462,123 | Nelson | Feb. 22, 1949 |